(12) United States Patent
Song et al.

(10) Patent No.: US 10,460,447 B2
(45) Date of Patent: Oct. 29, 2019

(54) METHOD AND SYSTEM FOR PERFORMING SEGMENTATION OF IMAGE HAVING A SPARSELY DISTRIBUTED OBJECT

(71) Applicant: Shenzhen Keya Medical Technology Corporation, Shenzhen (CN)

(72) Inventors: Qi Song, Seattle, WA (US); Hanbo Chen, Seattle, WA (US); Yujie Zhou, Beijing (CN); Youbing Yin, Kenmore, WA (US); Yuwei Li, Bellevue, WA (US)

(73) Assignee: Shenzhen Keya Medical Technology Corporation, Shenzhen (CN)

( * ) Notice: Subject to any disclaimer, the term of this patent is extended or adjusted under 35 U.S.C. 154(b) by 204 days.

(21) Appl. No.: 15/842,402

(22) Filed: Dec. 14, 2017

(65) Prior Publication Data
US 2019/0080456 A1    Mar. 14, 2019

Related U.S. Application Data
(60) Provisional application No. 62/557,500, filed on Sep. 12, 2017.

(51) Int. Cl.
| | |
|---|---|
| *G06K 9/62* | (2006.01) |
| *G06T 7/143* | (2017.01) |
| *G06T 7/13* | (2017.01) |
| *G06T 7/12* | (2017.01) |
| *G06T 7/194* | (2017.01) |
| *G06T 7/174* | (2017.01) |
| *G06T 7/11* | (2017.01) |

(52) U.S. Cl.
CPC ............... *G06T 7/143* (2017.01); *G06T 7/11* (2017.01); *G06T 7/12* (2017.01); *G06T 7/13* (2017.01); *G06T 7/174* (2017.01); *G06T 7/194* (2017.01); *G06T 2207/20081* (2013.01); *G06T 2207/30201* (2013.01)

(58) Field of Classification Search
CPC ... G06T 2207/20081; G06T 7/11; G06T 7/13; G06T 7/12; G06N 3/08; G06N 3/0454; G06K 9/4628
USPC ......... 382/157, 155, 156; 342/455; 340/435, 340/903; 701/301
See application file for complete search history.

(56) References Cited

U.S. PATENT DOCUMENTS

| | | | | |
|---|---|---|---|---|
| 7,480,570 | B2 * | 1/2009 | Yopp | B60W 30/16 340/435 |
| 9,760,807 | B2 * | 9/2017 | Zhou | G06T 7/143 |
| 9,972,092 | B2 * | 5/2018 | Lin | G06K 9/66 |
| 2018/0137335 | A1 * | 5/2018 | Kim | G06K 9/00604 |

* cited by examiner

*Primary Examiner* — Charlotte M Baker
(74) *Attorney, Agent, or Firm* — Bayes PLLC

(57) ABSTRACT

Methods and systems for segmenting images having sparsely distributed objects are disclosed. A method may include: predicting object potential areas in the image using a preliminary fully convolutional neural network; segmenting a plurality of sub-images corresponding to the object potential areas in the image using a refinement fully convolutional neural network, wherein the refinement fully convolutional neural network is trained to segment images on a higher resolution compared to a lower resolution utilized by the preliminary fully convolutional neural network; and combining the segmented sub-images to generate a final segmented image.

21 Claims, 12 Drawing Sheets

An Example Of Traditional Convolutional Neural Network For Classification

An Example Of A Fully Convolutional Neural Network For Segmentation

METHOD AND SYSTEM FOR PERFORMING SEGMENTATION OF IMAGE HAVING A SPARSELY DISTRIBUTED OBJECT

RELATED APPLICATIONS

This application claims the priority of U.S. Provisional Patent Application No. 62/557,500, filed Sep. 12, 2017, which is hereby incorporated by reference in its entirety.

TECHNICAL FIELD

The disclosure generally relates to a method and system for image segmentation, and more particularly to a method and system for segmenting an object in an image using a neural network.

BACKGROUND

An image segmentation system is a necessary part in many image analysis and processing systems. If an image is described as pixels arranged in a matrix, the function of an image segmentation system is to classify these pixels. The number of categories is set as needed. For example, software that recognizes human faces often needs to segment the human face, firstly to distinguish the pixels belonging to an anatomical region (foreground area) and the pixels belonging to a non-anatomical area (background area). And software that identifies natural landscape photos often needs to segment the image into different regions of the sky, mountains, rivers, and animals, etc.

Image segmentation systems are not only used in everyday life, but also have important applications in many areas, including maritime, military, meteorological, aerospace and medical fields. In the medical field, for example, the diagnosis system of cardiovascular disease first segments the vascular tissue; and the lung disease diagnosis system first segments lung trachea, pulmonary blood vessels, and the potential lung nodules. Accurate segmentation facilitates three-dimensional model reconstruction and visualization to assist physicians in the judgment, and is the fundamental guarantee for the accuracy of subsequent quantitative analysis of important clinical parameters such as size, shape, pixel statistics, and so on. Also for example, in the field of aerospace, the analysis system of the sky image first segments the image to distinguish the area of the star, planets and galaxies from the background area, and the analysis system of the atmospheric satellite remote sensing image needs to segment the clouds, land, waters and other areas. Regardless the application, the accuracy is an important indicator in the design of these segmentation systems, and another important indicator is the speed.

In order to obtain higher accuracy, the newly developed segmentation methods are equipped with data-driven methods based on machine learning. In such a system, the developer will deliver the pre-annotated image segmentation and the original image as training samples into the system together, calculate the statistical model among the data to find the rule, and complete the segmentation of the test image based on the learned rules.

In many machine learning methods, neural networks (i.e., deep learning) methods are applied in more and more image processing algorithms in recent years, because of their excellent performance. Among them, the convolution-based neural network (referred to as "convolutional neural network") method is particularly prominent. Neural network is a special computing network structure, which consists of multiple layers of computing units, wherein numerical values of an upper layer calculation unit are weighted and superposed, and then transferred to the next layer through a non-linear activation function. FIG. 1(a) shows a fully connected neural network with a three-layer structure; FIG. 1(b) shows a convolutional neural network, unlike a fully connected neural network, the connections in the convolutional neural network are relatively sparse, each calculation unit is connected only with computing units spatially adjacent to it in an upper layer, and the weights (a1, a2, a3, b1, b2, b3) for the connections are shared among different calculation units. The parameters required to be trained for convolutional neural network are significantly reduced compared to the fully connected neural network, and the training are much less difficult. At the same time, such a structure also conforms to the needs of image processing. In the traditional image processing method, the convolutional operations are often used to extract features such as edge, average brightness, etc., as shown in FIG. 1 (d). A specific convolution kernel is employed for detecting edges. Convolutional neural networks also use a similar principle, as shown in FIG. 1 (c). The difference is that a convolution kernel of a convolutional neural network is obtained through training by means of machine learning, and it can describe image features such as rounds, polygons, and even irregular shapes and the like by means of superposition of multi-layers of convolutional operations.

Convolutional neural networks are widely applied into image classification tasks. As shown in FIG. 1 (e), such a network is mostly composed of two parts: in the first part, the image is subject to a multi-layer convolution network and a maximum down-sampling operation to extract features. In the second part, the extracted features will be used to generate the final classification results via the fully connection layer. To implement the image processing tasks, in the general method, the target pixel is set as the center, a fixed sized image is extracted from the surrounding area of the center, and then the fixed sized image is classified. However, this method has significant drawbacks: the input image must be of a specific size due to the presence of the fully connection layer; the amount of computation required to perform a separate calculation for all the pixels is extremely large, and the same convolutional operations will be repeated in an area in which the images of the surrounding regions of the adjacent pixels overlap each other; in addition, since classification is performed for the surrounding regions of the fixed size, the convolutional neural network is usually used for recognition of a region (e.g., a human face region), rather than segmentation on a pixel level.

Recently, the fully convolutional neural networks have also been applied to image segmentation tasks. As shown in FIG. 1 (f), in the fully convolutional neural network for the segmentation system, the entire original image is directly input to the network for convolution and down-sampling operations to extract the features. In order to ensure that the size of segmented image, which is finally outputted, is consistent with that of the input image, de-convolutional operations and/or up-sampling operations are added in the downstream part of the network. When the final output is generated, the convolution kernel (convolutional layer 4) of size 1 is used to replace the fully connection layer. Different from the traditional machine learning methods that require manual intervention during pre-processing methods, feature extraction, and post-processing and require manually selecting a variety of segmentation parameters including threshold, the fully convolutional neural network is an end-to-end solution. That is, the input is the original image, and the output is a segmented image. Once the structure of the neural network is determined, all the rest of the process is automatically optimized by computational process, without the need for more manual intervention.

A fully convolutional neural network has at least the following advantages compared to conventional convolutional neural networks: (1) highly generalized model, the same system may be used for different segmentation tasks by adjusting the training samples and re-training; (2) high computational efficiency: eliminating the redundant computing operation in the overlapping area compared to the conventional convolutional neural network; (3) flexible image size: different from the traditional deep learning methods, the fully convolutional neural network does not require fully connection layers, and thus a fixed sized image is unnecessary; (4) short development cycle.

However, a fully convolutional neural network is computationally complex. Due to the need for a large number of convolution calculations, the requirement for the memory in the whole calculation process and the amount of calculation increases in a geometric progression with the increment of the image size. For example, for the processing of a three-dimensional CT image of normal size and a thin-slice, even with the top graphics card accelerator (GPU), the operation time is often still up to tens of minutes or even hours. This greatly limits the practical application of such methods in a variety of fields including medical images (especially three-dimensional images) or the like that have strict requirements on operation time and/or limited computational resources.

The distribution of the segmentation objects is often relatively sparse in a large proportion of an image. This disclosure provides a method and system based on an optimized fully convolutional neural network, which can complete the image segmentation task in a quick, efficient and accurate manner.

SUMMARY

The present disclosure provides an image segmentation method and system suitable for an image where objects are distributed sparsely. Such a method and system does not need to fix the size of the input image, has a high computational efficiency, a good versatility, reduce or even eliminate, in a maximum likelihood, the user's intervention and has an accurate and reliable segmentation results.

According to a first aspect of the present disclosure, there is provided a method for performing segmentation for a sparsely distributed object in an image, which uses a fully convolutional neural network for performing segmentation. The input is the image and the output is a final probability image characterizing the probability that each pixel belongs to the object. The fully convolutional neural network includes a preliminary fully convolutional neural network and a refinement fully convolutional neural network. The method includes inputting the image into the preliminary fully convolutional neural network, so as to predict object potential areas in the image. The method further includes using sub-images characterizing the object potential areas in the image as a front-end input of the refinement fully convolutional neural network, so as to calculate sub-probability images of refined segmentation. The method also includes combining the calculated sub-probability images to generate the final probability image.

In some embodiments, the preliminary fully convolutional neural network is constructed by connecting in sequence a down-sampling layer and one or more times of alternating convolutional layer and down-sampling layer successively connected.

In some embodiments, the preliminary fully convolutional neural network includes a single convolutional layer for predicting the probability that the corresponding pixel belongs to a background area. The preliminary fully convolutional neural network may further include a sparse convolutional layer connected in sequence, which is used for performing selective convolutional operation on the basis of the prediction of the single convolutional layer.

In some embodiments, the method for performing segmentation for a sparsely distributed object in an image also includes introducing, as an intermediate input, result predicted by the preliminary fully convolutional neural network and/or image features extracted by the convolutional layers in the whole fully convolutional neural network, into proper positions in the refinement fully convolutional neural network, the predicted result includes the object potential area and predicted probability image.

In some embodiments, introducing, as an intermediate input, result predicted by the preliminary fully convolutional neural network and/or image features extracted by the convolutional layers into the refinement fully convolutional neural network further includes: inserting the image features extracted by the convolutional layers and/or the predicted probability image at a position in the refinement fully convolutional neural network, so as to be combined with the current information at the position.

In some embodiments, introducing, as an intermediate input, result predicted by the preliminary fully convolutional neural network and/or image features extracted by the convolutional layers into the refinement fully convolutional neural network further includes: transmitting information at a certain position in the preliminary fully convolutional neural network and/or the refinement fully convolutional neural network to a posterior position by skipping one or more calculation layers, so as to be combined with the current information at the posterior position.

In some embodiments, introducing, as an intermediate input, result predicted by the preliminary fully convolutional neural network and/or image features extracted by the convolutional layers into the refinement fully convolutional neural network further includes: adding a parallel convolutional operation between two positions in the preliminary fully convolutional neural network and/or the refinement fully convolutional neural network, so as to combine the information obtained by the parallel convolutional operation and the current information at the posterior position out of the two positions.

In some embodiments, the certain position and the posterior position are respectively the output and input of the same type of layers in the refinement fully convolutional neural network.

In some embodiments, introducing a convolutional layer for calculating a mask between at least one convolutional layer in the whole fully convolutional neural network and the layer anterior to it, so that the at least one convolutional layer performs sparse convolutional operation based on the calculated mask.

In some embodiments, the method includes the training method of the fully convolutional neural network, and the training method includes at least one of the following: performing transfer learning for the trained fully convolutional neural network, such that a set of pre-trained network parameters can be refined for the segmentation of different types of images with the same dimension and similar intensity distribution; when there is not intermediate input within the refinement fully convolutional neural network or the intermediate input does not include image features extracted by the convolutional layers of the preliminary fully convolutional neural network, training the preliminary fully convolutional neural network and refinement fully convolutional neural network separately.

According to a second aspect of the present disclosure, a system to segment sparsely distributed object in an image is disclosed. The system uses a fully convolutional neural network for performing segmentation. The input is the image and the output is a final probability image characterizing the probability that each pixel belongs to the object. The fully convolutional neural network comprises a preliminary fully convolutional neural network and a refined fully convolutional neural network. The system includes a storage device, storing computer-executable instructions. The system further includes a processor, communicatively connected to the storage device and configured to execute the computer-executable instructions stored in the storage device. The computer-executable instructions are executed by the processor to perform a method. The method includes inputting the image into the preliminary fully convolutional neural network, so as to predict object potential areas in the image. The method further includes using sub-images characterizing the object potential areas in the image as a front-end input of the refinement fully convolutional neural network, so as to calculate sub-probability images of refined segmentation. The method also includes combining the calculated sub-probability images to generate the final probability image.

In some embodiments, the preliminary fully convolutional neural network is constructed by connecting in sequence a down-sampling layer and one or more times of alternating convolutional layer and down-sampling layer successively connected.

In some embodiments, the preliminary fully convolutional neural network is constructed as a single convolutional layer for predicting the probability that the corresponding pixel belongs to a background area. The single convolutional layer is used for predicting the probability that the corresponding pixel belongs to a background area and a sparse convolutional layer connected in sequence. The sparse convolutional layer is used for performing selective convolutional operation on the basis of the prediction of the single convolutional layer.

In some embodiments, the computer-executable instructions are executed by the processor to perform a method. The method includes introducing, as an intermediate input, result predicted by the preliminary fully convolutional neural network and/or image features extracted by the convolutional layers in the whole fully convolutional network, into proper positions in the refinement fully convolutional neural network, the predicted result includes the object potential area and predicted probability image.

In some embodiments, introducing, as an intermediate input, result predicted by the preliminary fully convolutional neural network and/or image features extracted by the convolutional layers into the refinement fully convolutional neural network further includes: inserting the image features extracted by the convolutional layers and/or the predicted probability image at a position in the refinement fully convolutional neural network, so as to be combine with the current information at the position.

In some embodiments, introducing, as an intermediate input, result predicted by the preliminary fully convolutional neural network and/or image features extracted by the convolutional layers into the refinement fully convolutional neural network further includes: transmitting information at a certain position in the preliminary fully convolutional neural network and/or the refinement fully convolutional neural network to a posterior position by skipping one or more calculation layers, so as to be combined with the current information at the posterior position.

In some embodiments, introducing, as an intermediate input, result predicted by the preliminary fully convolutional neural network and/or image features extracted by the convolutional layers into the refinement fully convolutional neural network further includes: adding a parallel convolutional operation between two positions in the preliminary fully convolutional neural network and/or a refinement fully convolutional neural network, so as to combine the information obtained by the parallel convolutional operation and the current information at the posterior position out of the two positions.

In some embodiments, the certain position and the posterior position are respectively the output and input of the same type of layers in the refinement fully convolutional neural network.

In some embodiments, introducing a convolutional layer for calculating a mask between at least one convolutional layer in the whole fully convolutional neural network and the layer anterior to it, so that the at least one convolutional layer performs sparse convolutional operation based on the calculated mask.

In some embodiments, the method further includes training the fully convolutional neural network. The training process includes at least one of the following: performing transfer learning for the trained fully convolutional neural network, such that a set of pre-trained network parameters can be refined for the segmentation of different types of images with the same dimension and similar intensity distribution; when there is not intermediate input within the refinement fully convolutional neural network or the intermediate input does not include image features extracted by the convolutional layers of the preliminary fully convolutional neural network, training the preliminary fully convolutional neural network and refinement fully convolutional neural network separately.

The following is a list of advantages provided by the various disclosed embodiments.

1. The disclosed embodiments are capable of handling a variety of image segmentation problems. The traditional segmentation methods are often segmentation methods specially designed for different kinds of data and different kinds of objects. This method uses a more advanced deep learning method. The model is general and the same system only needs to modify the training dataset to be applied to different problem scenarios. Manual intervention of changing the method or parameters is not necessary.

2. Traditional methods based on deep learning to fix the size of the image. The disclosed fully convolutional neural network is relatively flexible and can be applied to images of different sizes.

3. The disclosed embodiments take advantage the feature that the to-be-segmented tissue in the image tends to exhibit sparse distribution, and propose an effective acceleration method. Firstly the region where the tissue locates is quickly positioned through a large-scale preliminary prediction and then accurate segmentation is achieved by small-scale refinement. It is worth noting that the preliminary prediction and the refined segmentation are both done through fully convolutional neural network, so the accuracy, flexibility, versatility and other advantages can be guaranteed.

4. Unlike the conventional method, the disclosed system minimizes user input so that all the tasks may be automatically completed and the final segmentation result will be generated. The system can automatically adapt to the new data after being trained using a small amount of training samples.

BRIEF DESCRIPTION OF THE DRAWINGS

Embodiments of the present disclosure will be described in detail with reference to the accompanying drawings. The features, advantages, and techniques and applicability of the exemplary embodiments will be described below with reference to the accompanying drawings in which like reference numerals refer to like elements and in the drawings:

FIG. 1 (b) illustrates the architecture of a convolutional neural network;

FIG. 1 (c) illustrates the two-dimensional convolutional operation used in a convolutional neural network, wherein the convolution kernel is optimized by machine learning training;

FIG. 1 (d) shows an example of edge detection using a two-dimensional convolutional operation in a conventional image processing method, wherein the convolution kernel is specified for edge detection;

FIG. 1 (e) shows an example of a prior art convolutional neural network for image classification and identification;

FIG. 1 (f) shows an example of a prior art fully convolutional neural network for image segmentation;

DETAILED DESCRIPTION

The distribution of the segmentation objects in a large number of images is often relatively sparse. For example, the galaxies in the aerial image are sparsely distributed in the background image area, and the target regions or organs in the medical image as the segmentation objects are sparsely distributed in the entire image, and so on. Such sparsely distributed segmentation objects may be efficiently and accurately detected utilizing optimized fully convolutional neural networks configured in accordance with embodiments of the present disclosure.

In some embodiments, the disclosed system preliminarily predicts the distribution area of the object at a low resolution using a fully convolutional neural network (hereinafter referred to as "preliminary convolutional neural network") to reduce the search area. The disclosed system may then use another fully convolutional neural network (hereinafter referred to as "refinement convolutional neural network") to further predict objects in the reduced search area at a high resolution so as to accurately segment the object. In some embodiments, the results at the two resolutions may also be fused so that the segmentation task of the object in the image can be completed with both speed efficiency and accuracy. In some embodiments, the steps of preliminary prediction and/or refined segmentation are not limited to be executed only once, but may be performed multiple times respectively. That is, the preliminary prediction may be performed multiple times, and so may the refined segmentation.

For illustrative purposes, descriptions are made by taking a medical image for example, but it should be understood that the disclosure can also be applied to other images having sparsely distributed segmentation objects. Note that, in this context, the term "segmentation object" refers to an object to be segmented in an image, and the object in an image of different fields may vary depending on the situation. For example, in a medical image, the object may be the target object to be diagnosed and treated by a physician, such as coronary artery in the diagnosis of cardiovascular diseases, the target region in X-ray imaging diagnosis, and so on. As another example, in ordinary digital photos, the object may be a human face. As yet another example, in satellite remote sensing photos, the object may be farmland, forests, fortifications, meteorological elements, etc. In digital images of the field of security, the object may be contraband-related sensitive objects, and so on. Regardless of the content and size of the image (e.g., 1-dimensional, 2-dimensional, or high-dimensional), as long as the distribution of the object in the image is sparse, the disclosed embodiments may be applied for efficient, rapid and end-to-end segmentation of the object in the image. Sparse distribution herein refers particularly to the area in which the segmentation object occupies in an image is less than half of the image, e.g., less than 10%.

Figure 1A:
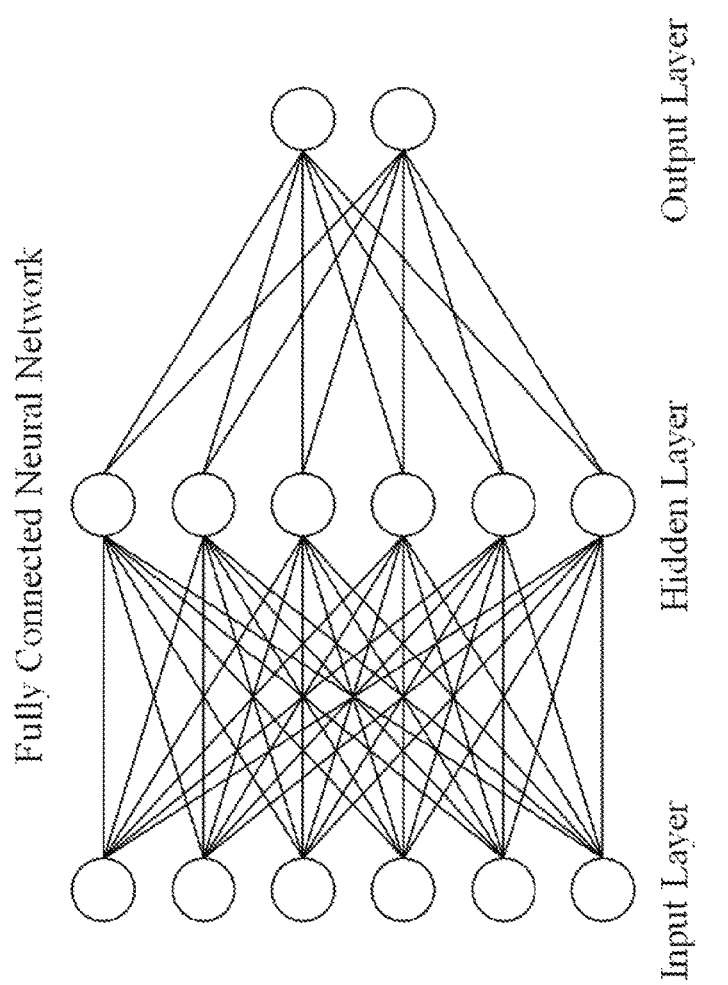
FIG. 1 (a) illustrates the architecture of a fully connected neural network.
Figure 1B:
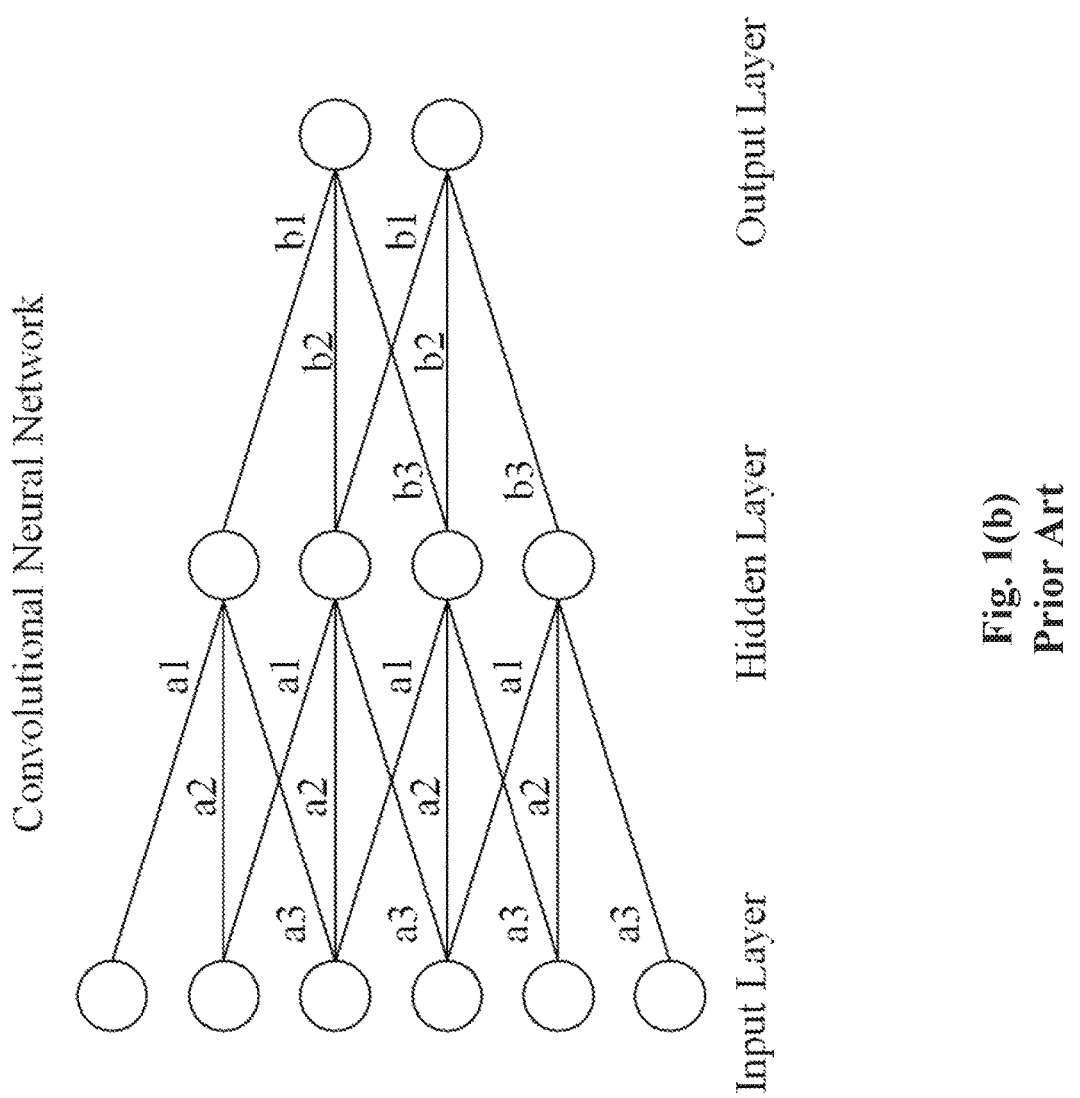
Figure 1C:
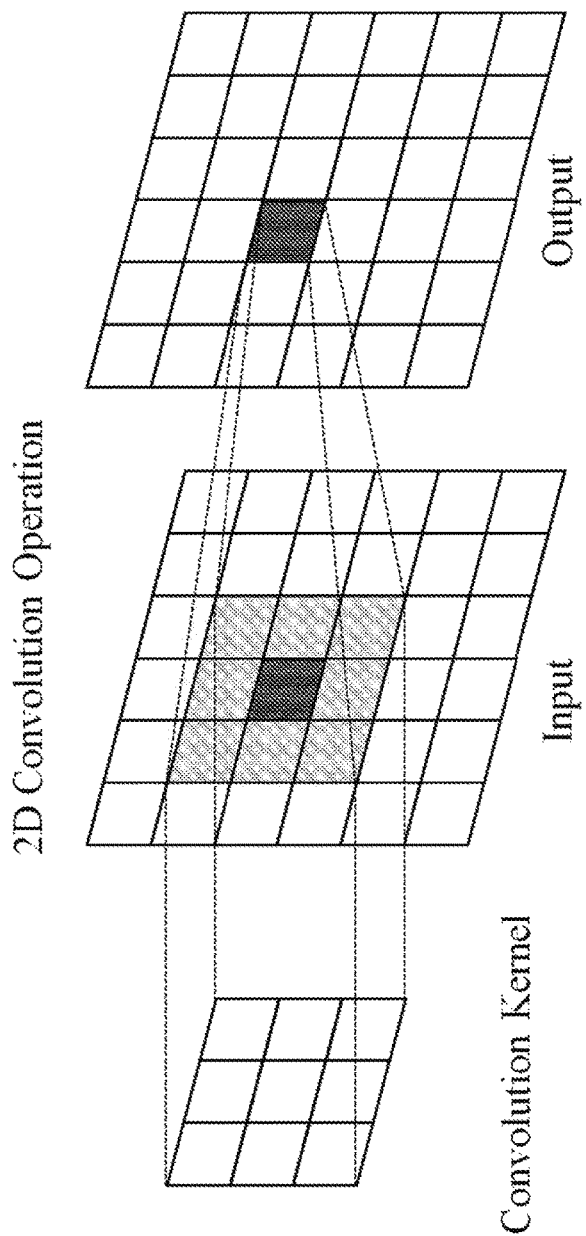
Figure 1D:
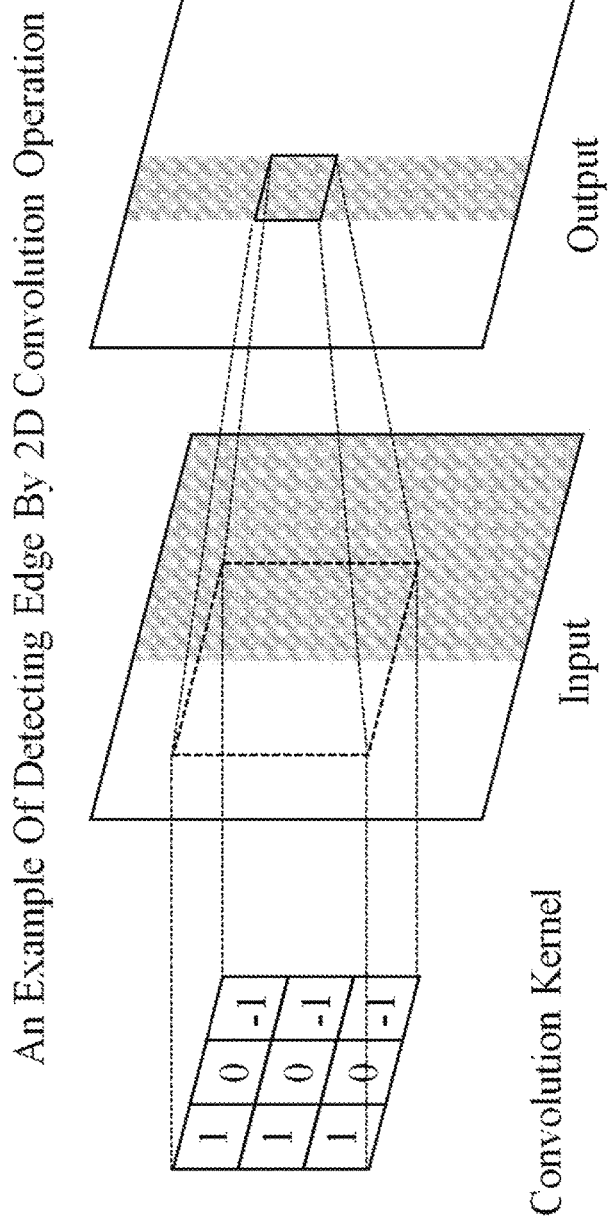
Figure 1E:
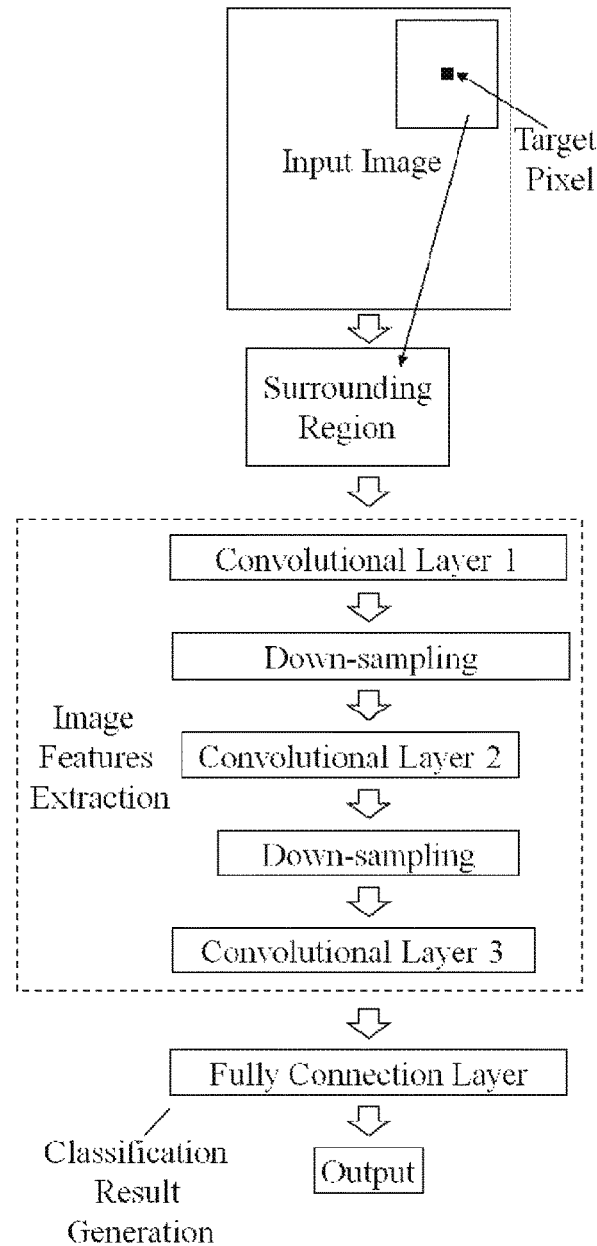
Figure 1F:
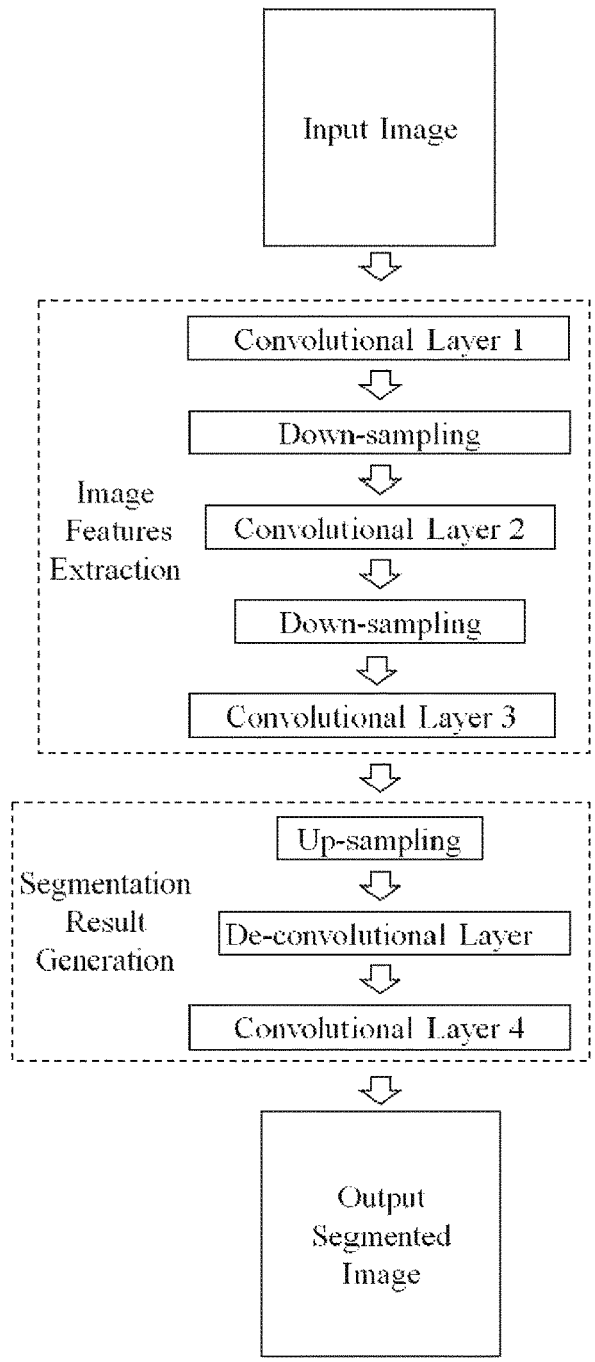
Figure 2:
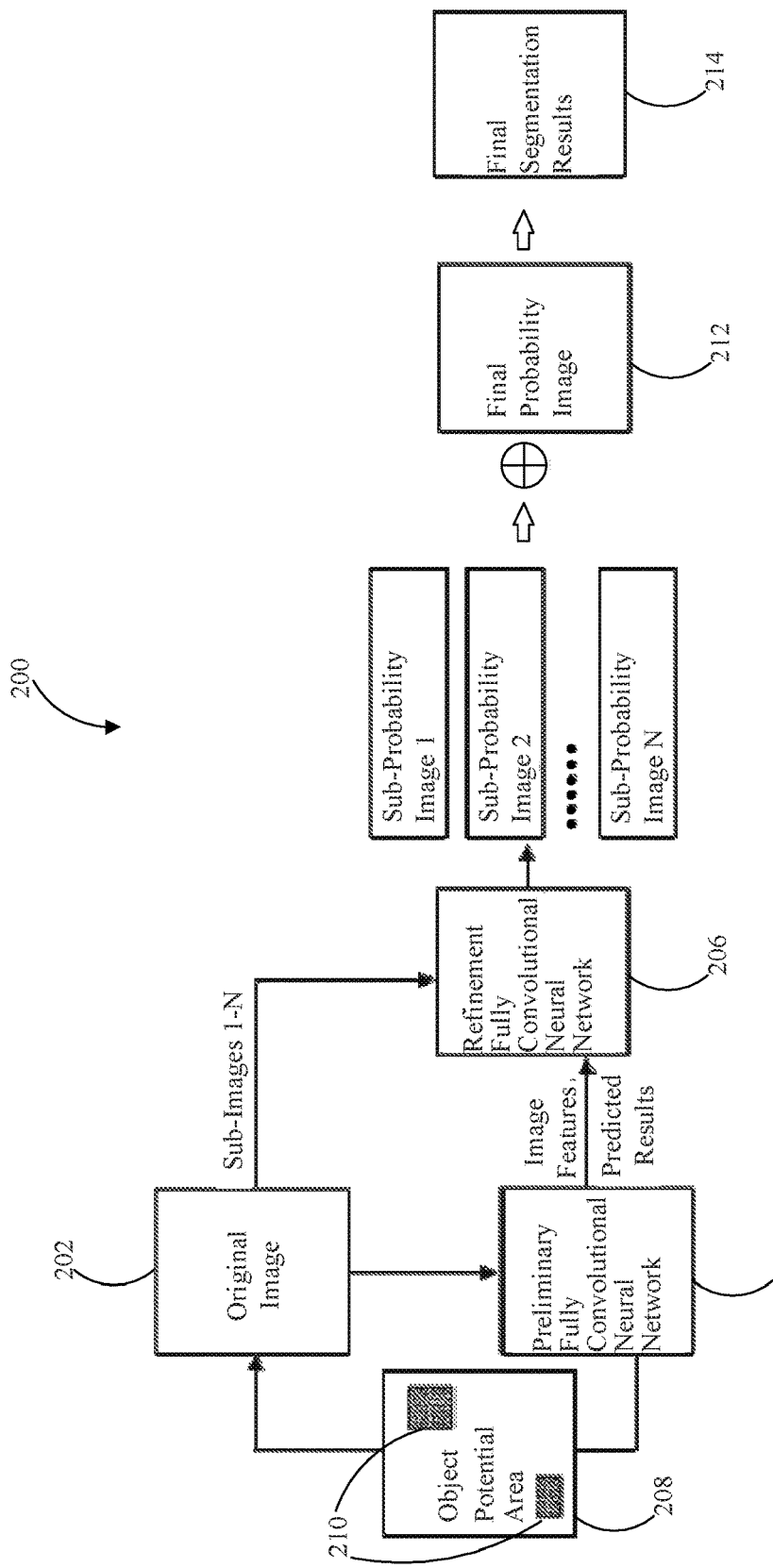
FIG. 2 shows a block diagram of a method for performing segmentation for a sparsely distributed object in an image according to an embodiment.

FIG. 2 shows a general block diagram of a method 200 for segmenting a sparsely distributed object in an image 202 in accordance with an embodiment of the present disclosure. As shown in FIG. 2, a fully convolutional neural network for segmenting a sparsely distributed object is utilized. The whole fully convolutional neural network is mainly comprised of two sub-networks, which are the preliminary fully convolutional neural network 204 and the refinement fully convolutional neural network 206. It is noted that while only one preliminary fully convolutional neural network 204 and one refinement fully convolutional neural network 206 are shown in FIG. 2, such a depiction is utilized merely for illustration purposes. It is contemplated that the number of preliminary fully convolutional neural networks 204 and/or the number of refinement fully convolutional neural networks 206 may vary. For instance, a user may adopt a plurality of sub-networks respectively, and any one of the steps of preliminary prediction and refined segmentation may be performed several times respectively.

As shown in FIG. 2, the method first provides the original image 202 as an input into the preliminary convolutional neural network 204, which is configured to predict the region where the object in the original image may be located (that is, object potential areas). The input of the preliminary fully convolutional neural network 204 is the original image 202, and the output thereof includes the predicted probability image 208, and the value of each pixel in the predicted probability image 208 represents the probability that a certain object appears in the region of the original image corresponding to the pixel. There may be multiple objects, each with a corresponding predicted probability image 208. The spatial resolution of the output predicted probability image 208 may be smaller than the original image so that each pixel in the predicted probability image 208 may correspond to an area in the original image 202. Depending on the value of each pixel in the predicted probability image 208, the subsequent search area may be reduced. Specifically, the area having no object distributed may be filtered out from the original image 202 by various means so as to obtain an object potential area. For example, an object occurrence threshold may be set and value of each pixel in the predicted probability image may be compared with the object occurrence threshold. Accordingly, an area in the original image 202 corresponding to the pixels, the values of which are larger than or equal to the object occurrence threshold, may be considered to be an object potential area 210. Areas not satisfying the threshold condition may be considered not being an object potential area. Also for example, the comparison results between the values of the respective pixels in the predicted probability image and the object occurrence threshold may be combined with the local distribution characteristics of the comparison results, such as, there are at least n positive comparison results, n is a preset integer equal to or greater than 1, in the adjacent surrounding of a positive comparison result (indicating the area corresponding to the pixel is the object potential area) or the like, so as to determine whether the area in the original image to which each pixel corresponds is the object potential area. In some embodiments, a down-sampling layer is provided in the preliminary fully convolutional neural network 204 or at the upstream thereof, thus it is possible to increase the field of view of the prediction results to achieve a more global judgment on one hand, and on the other hand, to reduce the image size to thereby have an accelerated effect, and optionally adapts to the processing requirements of the image processor. Since the predicted probability image 208 does not need to be restored to the same size as that of the original image 202, it is not necessary to use the up-sampling layer and the de-convolutional layer in the preliminary fully convolution network. In this preliminary fully convolutional neural network 202, the extraction of the image features and the prediction of the object potential region is completed through alternating use of the convolutional layer and the down-sampling layer (as illustrated in FIG. 1 (f) and FIG. 3).

Then, based on the object potential areas 210 obtained by the preliminary fully convolutional neural network 204, the original image 202 will be segmented into smaller sub-images 1-*n* (i.e., sub-images representing the object potential regions 210) as an input image of the refinement fully convolutional neural network 206, in order to calculate the precisely segmented sub-probability images 1-*n* through the network. The calculated sub-probability images 1-*n* will be combined to generate a final probability image 212. The size and resolution of the final probability image 212 are consistent with the original image 202. The value of each pixel is in the range of 0 to 1, and is the probability value that the pixel belongs to a certain object, thereby a quantized display of the probability that each pixel in the original image 202 belongs to the object is obtained; the number of objects targeted for the image segmentation may be a plurality of objects, and a final probability image 212 will be obtained far each object, wherein the value of each pixel is the probability value that the pixel of the original image belonging to this object. If all possible objects in the image are included, the sum of the probability values that an individual pixel belongs to the various objects is 1. Further, the segmentation result of the object in the original image 202 can also be obtained by comparing the values of the respective pixels in the final probability image 212 with the threshold and/or combining the local distribution characteristics of the comparison results (for details, see the corresponding part of the preliminary prediction). The refinement fully convolutional neural network 206 is a complete fully convolutional segmentation network, which is comprised of two sections: feature extraction and segmentation prediction. The feature extraction section is usually composed of convolutional layer(s) and down-sampling layer(s). The segmentation prediction section is after the feature extraction section, whose function is to complete the segmentation prediction and restore the image spatial resolution, which is usually comprised of convolutional layer(s) and de-convolutional layer(s) (and/or up-sampling layer(s)).

The various parts of a fully convolutional neural network are described in detail below.

Convolutional Layer

The convolutional operation is done in the convolutional layer. The convolutional operation is a weighted superposed operation to the input according to the convolution kernel. The weight values in the convolution kernel are optimized by the training process. The other parameters of the convolutional operation have to be preset, and the settings may be manual or may be set by the processor according to a predetermined rule. These parameters include:

- size of the convolution kernel—the range of each convolutional operation;
- number of the convolution kernels—the number of features that are output. The greater the number is, the better the description capability is, and the greater the amount of computation and storage requirements is;
- step size—the number of pixels moving between the two adjacent convolution operations, from the previous convolution operation to the next convolution operation. If the convolution step size is not 1, the spatial resolution of the output image will be smaller than that of the input image, and it can be used to reduce the spatial resolution of the output image, thereby realizing the acceleration of the calculation and the enlargement of the field of view. As an example and to make the description more legible, the convolution step sizes in the example illustrated herein are set to 1 each, and the reduction of the spatial resolution is all done by the down-sampling operation, but the convolution step size is not limited to this.
- zero padding—after convolutional operation, the output image will have less pixels at the edge compared to the input image. This problem may be solved by padding with zeros at the edge of the input image.

De-Convolutional Layer

De-convolutional operation is a special convolution calculation. Unlike the normal convolutional operation, the size of the output image of the de-convolution calculation will be larger than the size of the input image, so that the purpose of restoring the image size can be achieved by providing the de-convolutional operation at downstream of the convolutional layer. It has all the property of the convolutional operation, at the same time it also needs one more parameter that needs to be set compared to the convolutional operation:

- sampling interval—before convolution, an interval will be inserted between pixels of the input image, and the pixels within the interval will be filled with zero. The adding of the interval is intended to achieve the purpose of restoring the image size of the output image of the de-convolutional layer.

Activation Function

The activation function may include a fixed non-linear function. The alternatively combined use of linear operations (such as convolution) and non-linear operations (such as activation functions) is the basic property of neural networks. There are a variety of non-linear functions, such as sigmoid, rectified linear unit (ReLU) and so on. In most cases, an activation layer is appended behind the convolutional operation and the dc-convolutional operation. Therefore, in order to make the description clearer and concise, we have omitted the display and explanation of the activation layer in the drawings and the description below, and only the convolutional layer, the de-convolutional layer and the like are shown. Note that it is the default that convolution and de-convolution operations of the respective convolutional layer and de-convolutional layers are followed by the activation operation, where each of the convolution and de-convolutional layers is actually provided with a following activation function. The convolution and de-convolutional layers as shown may be respectively understood as a convolution-activation composite layer and a de-convolution-activation composite layer. Otherwise specified, the image feature specially refers to the output of the convolution-activation composite layer.

Down-Sampling Layer

The down-sampling layer down samples the input image. The input of the down-sampling operation is a plurality of spatially consecutive pixels, and the output of which is a pixel. The output pixel may be the maximum, average, median, or other operation result of the input. The purpose of down-sampling is to reduce the characteristics of spatial redundancy and to increase the field of view of subsequent convolutional operations.

Up-Sampling Layer

The up-sampling layer will up sample the input image. The input of the up-sampling operation is one or more spatially consecutive pixels, and the output of which is multiple pixels. The function of the up-sampling layer is to restore the image resolution. The nearest value sampling, linear interpolation sampling, b-spline sampling, or other operation results may be used for the up-sampling algorithm.

Figure 3:
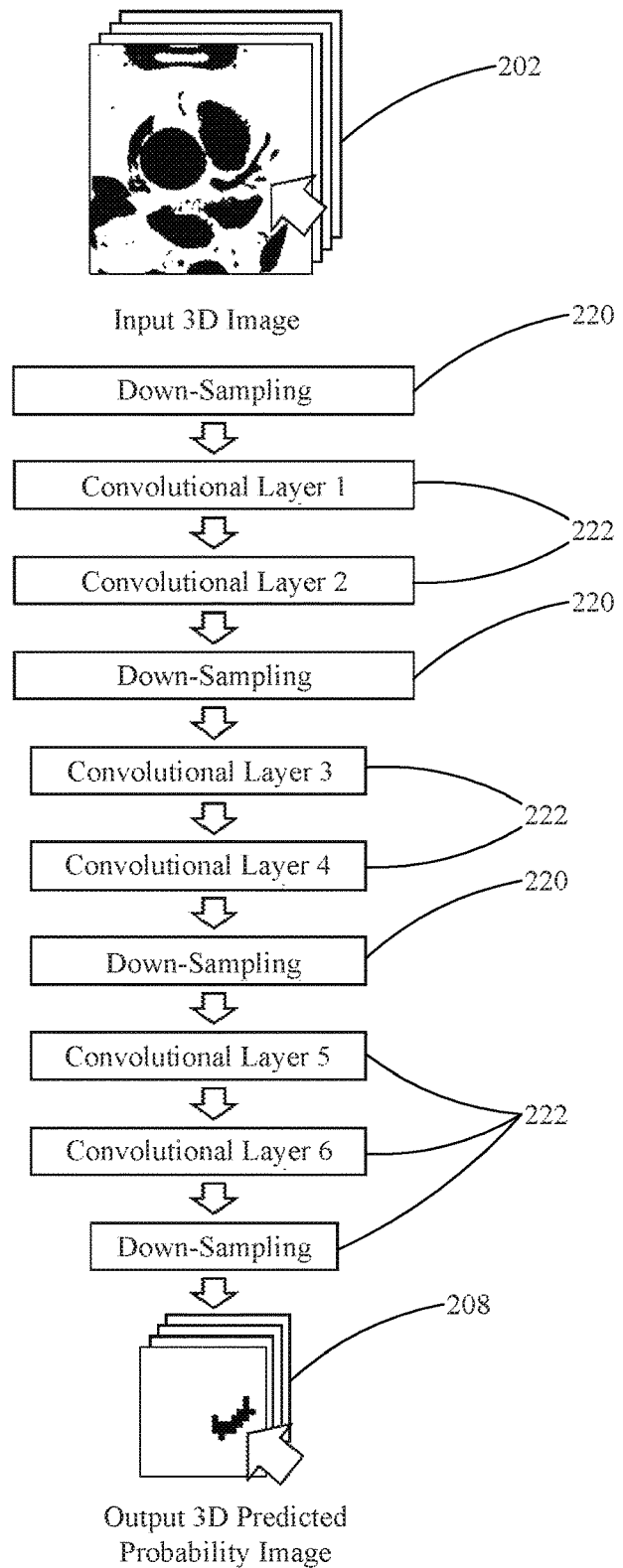
FIG. 3 shows an example of a neural network for preliminary prediction of a sparsely distributed object in a three-dimensional image according to another embodiment.

FIG. 3 shows an example of a neural network for preliminary prediction of a sparsely distributed object in a three-dimensional image according to an embodiment of the present disclosure, which is also an example of preliminary fully convolutional neural network 204 described above. As shown in FIG. 3, the neural network 204 first reduces the size of the input original image 202 through a down-sampling layer 220 to effectively accelerate calculation and to increase the field of view. Then, the extraction of the image features and the prediction of the object potential region(s) are accomplished by processing the image using the convolutional layers 222 and the down-sampling layers 220 alternatively at least once. Here, the two adjacent layers can be different types of layers out of the convolutional layer 222 and the down-sampling layer 220, or may be the same type, and the number of convolutional layers 222 may be different from the number of down-sampling layer 220, as long as alternative usage of the convolutional layers 222 and the down-sampling layers 220 is generally realized in the neural network 204. If the output image after each time of down-sampling in the neural network has half the size of the input image, the size of the output predicted probability image equals to 1/16 of the size of the input image in each dimension, by utilizing 4 down-sampling layers as shown in FIG. 3. Taking the input image 202 being a 3D image as an example, the value of one pixel in the output predicted probability image 208 represents the probability that a three-dimensional region composed of 16×16×16 pixels in the input image includes an object, that is, the pixel may be used to predict whether an area composed of 16×16×16 pixels in the input image includes an object (whether the area is an object potential area).

As an example, the preliminary fully convolutional neural network 204 may predict the potential area of coronary arteries in 3D computed tomography angiography (CTA) images. The structure of the neural network 204 is also applicable to other imaging modalities, including preliminary predictions of object potential regions in three-dimensional images such as computed tomography (CT), ultrasound, nuclear magnetic resonance, and other modalities, as well as preliminary predictions of object potential regions in images of other dimensions (such as 1-dimensional, 2-dimensional, or high-dimensional) of various imaging modalities.

It is contemplated that the structure of the neural network 204 is not limited to the above example. For example, the depth of the neural network may be deeper or shallower, and the down-sampling layer 220 may also be replaced by a convolutional operation with a step size not equal to 1. Deepening the network 204 can improve the network's ability to express and the size of the field of view of the final decision so as to deal with more complex situations to improve accuracy, but the deepening of the network 204 will also increase the complexity of the calculation so that the required time for operations is increased. The specific depth range of the network 204 will be determined depending on the specific situation of the segmentation object and the size of the field of view that required to make the correct decision. For example, if we need to segment eyes in a photo, because eyes often only occupy a very small space in the picture and local features are significant, the segmentation network only needs about 10 layers in depth to make a good judgment. But if we need to segment and distinguish eyes of different animals, although the size of the segmentation object has not changed, the judgment cannot be done only based on the eye area, but also need to consider the facial features and even body characteristics of animals, so the size of the field of view needed for the final prediction and complexity extent would be much higher than the previous task, thus the depth of the network 204 will need to be increased to 50 layers or more. According to practice results obtained for various types of images with sparsely distributed objects, the initial depth of the network 204 may be set to between 10 and 20 layers (this depth typically behaves well), and if the segmentation results are relatively satisfactory, the depth of the network 204 may be gradually reduced, and vice versa, the depth of the network 204 may be deepen till it gets a result that relatively balances accuracy and speed. The preliminary fully convolutional neural network 204 cooperates with the refinement fully convolutional neural network 206 (depicted in FIG. 2 above, and will be further described in details below) to obtain the object segmentation result of the original image 202. In some embodiments, in addition to the operation of successive layer connection in series (as shown in the example of FIG. 1 (f)), we also introduce other branches (branches in various connection manners such as insert, short-circuit, parallel connection, and so on) within or among the respective fully convolutional neural networks, so that different types of image features (such as local and global features) from different convolutional layers may be directly fused to improve the overall performance of the network.

For example, as shown in FIG. 2, the refinement fully convolutional neural network 206 not only obtains the sub-image of the object potential region 210 from the preliminary fully convolutional neural network 204 as the front-end input, but also (but not necessarily) obtains image features extracted by individual layer of the preliminary fully convolutional neural network 204 and/or preliminary prediction result (including the object potential region and the predicted probability image, etc.), and introduces the same as an intermediate input into proper positions in the refinement fully convolutional neural network for subsequent calculation.

The intermediate input of the refinement fully convolutional neural network 206 may come from the preliminary fully convolutional neural network 204, or it can come from itself.

For example, it is possible to introduce branch(es) at an appropriate position in the refinement fully convolutional neural network 206, in various connection manners, such as insert, short-circuit, and parallel connection and so on. Next, various connection manners will be firstly described in details below.

Insert

Figure 5:
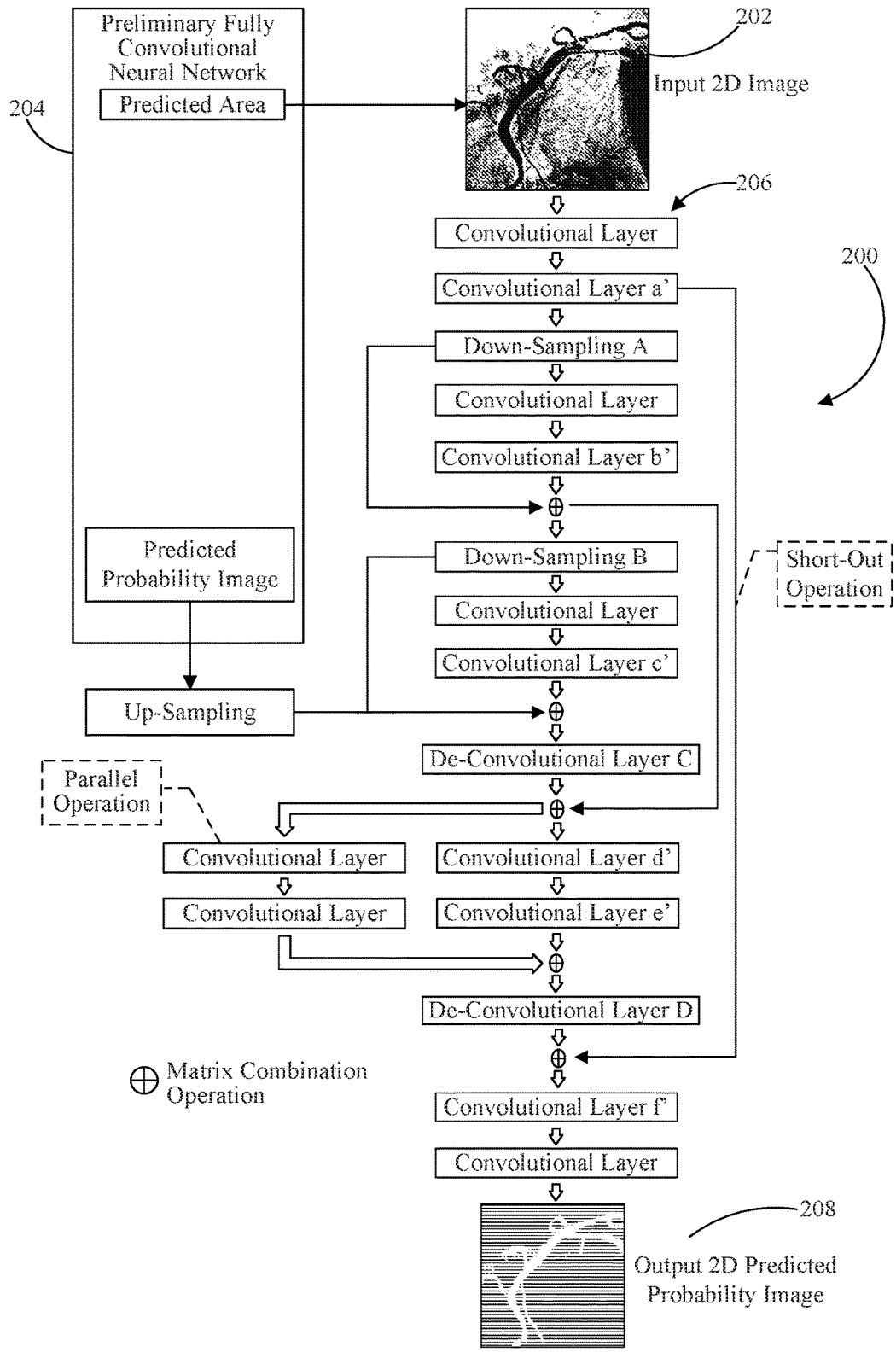
FIG. 5 illustrates another example of a neural network for segmenting a sparsely distributed object in a two-dimensional image according to still yet another embodiment.

Specifically, the image features extracted by the preliminary fully convolutional neural network 204 and/or preliminary prediction results may be introduced into proper positions in the refinement fully convolutional neural network 206. As shown in Mg. 4, for example, the image features extracted through the preliminary fully convolutional neural network 204 may be inserted into respective positions of the refinement fully convolutional neural network 206. In one example, the image feature extracted by the convolutional layer 2 may be inserted into the input position. In another example, the image feature extracted by the convolutional layer 4 may be inserted between respective units (a unit is constructed by connecting several convolutional layers and down-sampling layers in series). In still another example, the image feature extracted by the convolutional layer 6 may be inserted at a position between the feature extraction section and the segmentation prediction section. This type of connection is called. "insert", and the inserted information may be combined with the current information at that location (for example, adding or an operation of matrix combining) as input for the downstream portion. As shown in FIG. 5, for example, a predicted probability image obtained by the preliminary fully convolutional neural network 204 may be inserted (e.g., after up-sampling) into the segmentation prediction section in the refinement fully convolutional neural network 206, for example, inserted at a position between the convolutional layer and the de-convolutional layer of the segmentation prediction section. Because the image resolution of the input image of the refinement fully convolutional neural network is relatively high, the field of view of the convolutional operation is limited, and the acquired feature content is relatively local and lacks global information. And because the preliminary fully convolutional neural network produces a down-sampled image, the convolution feature obtained in the calculation process the output of each convolutional layer after the activation function) and predicted probability image obtained by the final preliminary prediction will contain relatively more global information. So the insert operation introduced here will be able to compensate for global spatial feature information. Note that the above insertion positions serve as examples only, instead of limitation.

Short-Circuit

Again for example, we can transfer the information at a certain position (such as image features obtained by convolution, etc.) directly to a posterior position (such as accumulating or concatenating with the output of a posterior layer), skipping some (one or more than one) computational layers. This kind of connection is referred to as "short-circuit." In a short circuit, the certain position and the posterior position are respectively the output and input of the same type of layer in the refinement fully convolutional neural network 206, such as the "short-circuit" between the output of down-sampling layer A and the input of the down-sampling layer B. As shown in FIG. 5, such short-circuit may be relative short connections that exist between layers that are not very far apart, or may be relative long connections between layers that are distant from each other; the information drawn by the short-circuit and the current information at the position where the short-circuit is introduced may have the same property such as the resolution of the image, in order to facilitate the combination of the information (for example, splicing). The short-circuit branch may be drawn from any kind of the positions including at the convolutional layer, at the sampling layer, and the position between the layers (each of the three short-circuit branches in FIG. 5 shows one kind respectively). Among them, a local short-circuit may cause the convolutional operation that is short-out to learn higher levels of image features, and long short-circuit provides lossless local feature information during the restoration of image resolution and segmentation prediction to ensure the sharpness of the final segmented image.

Parallel

Furthermore, if a parallel convolutional operation is further added between two positions in the network, a parallel branch is formed. FIG. 5 shows a parallel branch including two convolutional layers can be formed between the input of the convolutional layer d' and the output of the convolutional layer e'. The information (e.g., image features) obtained by the parallel branch and the current information (e.g., image features) at the output of the convolutional layer e' can be combined (e.g., matrix concatenation or accumulation). In a parallel branch, we may use convolutional layers of different parameters (such as convolution kernels of different sizes) or use different numbers of convolutional layers. The purpose of this is to extract different types of image features, and then to fuse these features.

Figure 4:
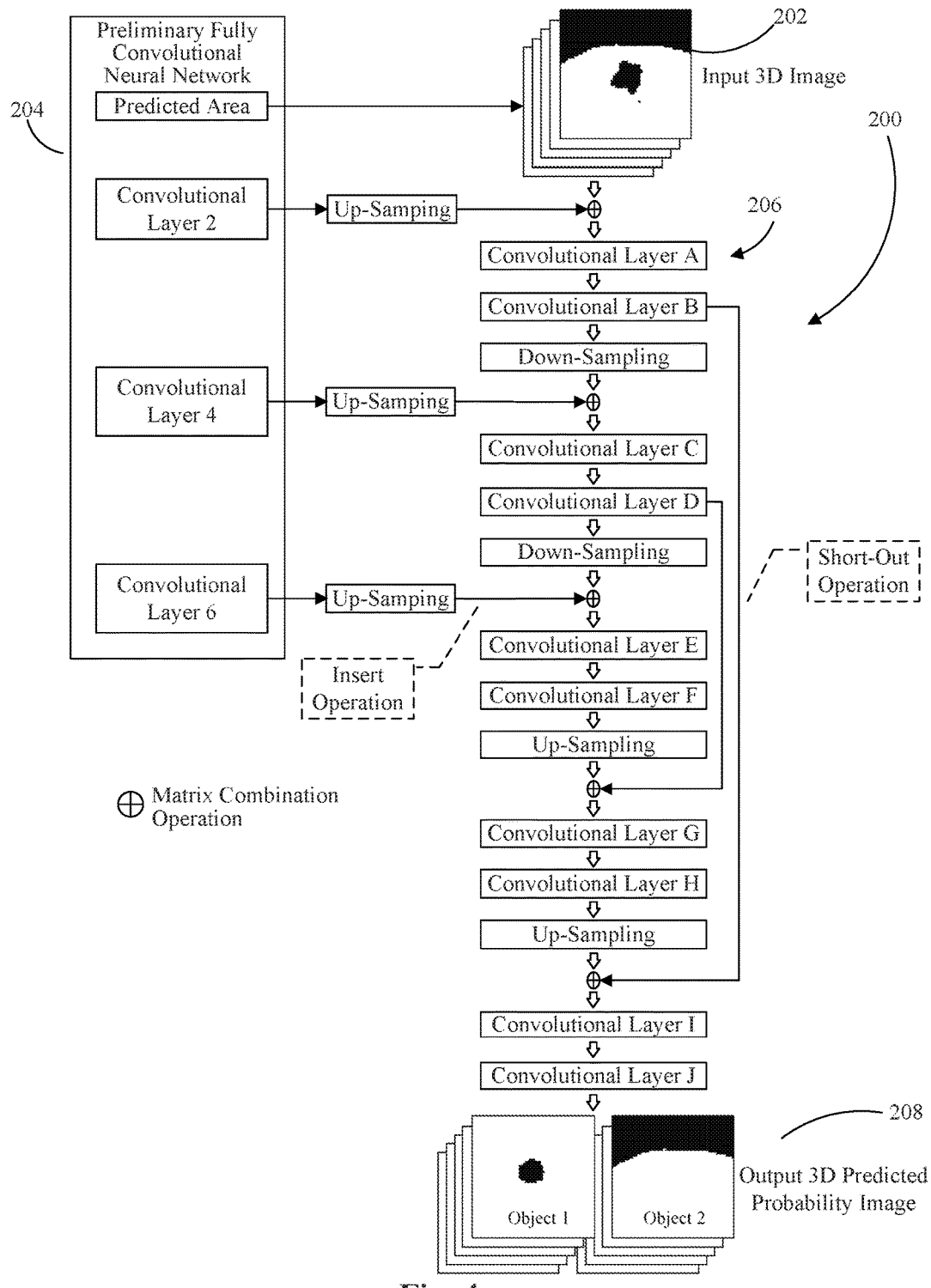
FIG. 4 illustrates an example of a neural network for segmenting a sparsely distributed object in a three-dimensional image according to yet another embodiment.

FIG. 4 and FIG. 5 show two examples of a refinement fully convolutional neural network 206, respectively.

FIG. 4 shows an example of cross-linking a preliminary fully convolutional neural network 204 to a refinement fully convolutional neural network 206. As an example, the input image 202 here is a 3D image, and the output is a 3D probability image 208 of two different objects. In some embodiments, the original image 202 is cut into sub-images according to the object potential regions 210 obtained by the preliminary prediction. The sub-images may be provided as input to the refinement fully convolutional neural network 206. The features are extracted by convolution and down-sampling operations and the preliminary judgment is made. This process is similar to the preliminary neural network 204. In some embodiments, in order to be able to better combine the spatial information characteristics at large scales, and fuse the image features at different resolutions, the image features obtained by respective convolutional layers of the preliminary fully convolutional neural network 204 at a low resolution as shown in the example of FIG. 3 are introduced into different positions in the feature extraction section (as described above in detail), thereby some global spatial feature information may be supplemented. Specifically, as shown in the example depicted in FIG. 4, the image features extracted by the convoluted layer 2 of the preliminary fully convolutional neural network 204 are inserted into the input of the refinement fully convolutional neural network 206; the image features extracted by the convoluted layer 4 of the preliminary fully convolutional neural network 204 are inserted into a position between the convolutional layer c and the adjacent down-sampling layer upstream thereof; and the image features extracted by the convoluted layer 6 of the preliminary fully convolutional neural network 204 are inserted into a position between the convolutional layer e and the adjacent down-sampling layer upstream thereof. Since the spatial resolution of the image features obtained in the preliminary prediction is low, up-sampling operation is performed before the fusion to restore the spatial resolution. The fusion process can be done by matrix summation or concatenation. After the feature extraction is complete, the refinement fully convolutional neural network 206 performs image size restoration and performs the final segmentation calculation 214 by alternate operation of up-sampling and convolution. Since we use the down-sampling operation in the feature extraction section to obtain a larger field of view, the final extracted features may lose certain spatial detailed features. Consequently, in the restored image there may be a situation that blurring appears in some edge regions of the restored image. In order to solve this problem, the matrix through each up-sampling operation of the refinement fully convoluted neural network 206 may be combined with the image features at the same resolution in the previous feature extraction section, to supplement the lost space detailed features. As a result, the optimum segmentation performance may be achieved through the fusion of subsequent convolutional operation. For example, as shown in FIG. 4, in order to restore the image size, the upper and lower sampling layers are set, which expand and reduce respectively the input feature image by the same multiples. The resolution of the feature matrix obtained by the convolutional layer is the same as that of the matrix obtained, by the respective layer, which is spaced from the convolutional layer by pairs of up-sampling and down-sampling layers. Specifically, the input matrix of the convolutional layer g shown in FIG. 4 is obtained by splicing the matrix provided by the up-sampling layer immediately adjacent upstream thereof with the image features provided by the convolutional layer d upstream thereof and spaced apart therefrom by a pair of up-sampling and down-sampling layers, which is achieved by connecting the output of the convolutional layer d to the input position of the convolutional layer g in a short-circuit manner. The input matrix of another downstream convolutional layer i may be obtained by: splicing the matrix provided by the up-sampling layer immediately adjacent upstream thereof with the image features provided by the convolutional layer h upstream thereof and space apart therefrom by two pairs of the up-sampling and down-sampling layers, which is achieved by connecting the output of the convolutional layer b to the input position of the convolutional layer i in a short-circuit manner. By splicing the image features under the same resolution with the obtained matrix, the re-sampling and registration steps are omitted compared to the splice of matrixes under different resolutions, and it is easier to operate, and can more accurately recover the missing spatial detailed features. The matrix resulted by splicing expresses various levels of space details, and an optimum segmentation performance can be obtained through fusion of various levels of spatial details by subsequent convolutional operations.

The overall structure of the refinement fully convolutional neural network 206 shown in FIG. 5 is similar to that in FIG. 4. The difference lies in that, in the neural network depicted in FIG. 5, we have removed the fusion with the features obtained in the preliminary prediction step. Instead, we insert the predicted probability image out of the preliminary prediction result as an input into the refinement fully convolutional neural network 206. As an example, the predicted probability image is inserted into the position between the convolutional layer c' and the de-convolutional layer C after being up-sampled, to be combined with the output information of the convolutional layer c', so as to be used as the input information of the de-convolutional layer C. This may not only preserve and fuse the global spatial feature information, but also separate the training process of the two networks 204 and 206 so as to facilitate the parallel implementation of the training process of the respective networks 204 and 206 to accelerate the entire training process. In addition, the de-convolutional layer is used instead of the up-sampling layer in FIG. 5 for image size restoration. In the downstream convolutional layers, the input of the convolutional layer f is obtained by concatenating a matrix outputted from the de-convolutional layer D immediately adjacent upstream thereof with image features outputted from the convolutional layer a' which is spaced apart therefrom by two pairs of down-sampling layer and de-convolutional layer (which is similar to the input matrix of the convolutional layer i in FIG. 4). The input of the convolutional layer d' is different from the input matrix of the convolutional layer g as shown in FIG. 4 in that the matrix output by the de-convolutional layer C immediately adjacent upstream thereof and the spliced feature matrix at the input of the down-sampling layer B upstream thereof and spaced apart therefrom by a pair of de-convolutional layer and down-sampling layer. To be specific, the concatenated feature matrix at the input of the down-sampling layer B is obtained by concatenating the image features extracted by the convolutional layer h' with the output matrix of the down-sampling layer A.

In some embodiments, short-circuit connections may be utilized to improve the efficiency of the neural network 206. For example, in the neural network 206, before some down-sampling or de-convolution operations, we may adopt short-circuit connections from input of the down-sampling or de-convolution layer to the output of the upstream previous down-sampling layer or de-convolutional layer. For example, the matrix output from the down-sampling layer A may be short-circuit connected to the input of the down-sampling layer B, and the matrix output from the down-sampling layer B may be short-circuit connected to the input of the de-convolutional layer C. In this way, the images before and after convolution at the same resolution may be combined as the input of this down-sampling layer or de-convolutional layer, which facilitates to ensure that new high-scale features are obtained by training instead of copying the low-scale features obtained by previous training during each convolution process.

The example shown in FIG. 4 is applied by cooperation with the preliminary fully convolutional neural network 204 into the three-dimensional CT image, which segments the pixels of lung region and the pixels of the pulmonary nodule region. The example shown in FIG. 5 is applied by cooperation with the preliminary fully convolutional neural network 204 into a 2D digital subtraction angiography (DSA) image to segment the pixels of the blood vessel region.

In addition, the structure of the specifically selected fully convolutional neural network is not limited to the examples as shown. For example, the networks in FIG. 4 and FIG. 5 may be combined, and the number of layers of the network may also be increased or decreased. The feature extraction section therein may adopt down-sampling, and may also adopt convolutional operation with the step size being not equal to 1, to increase the field of view of the convolution. Furthermore, it is contemplated that the up-sampling operation and/or the de-convolutional operation may be adopted to achieve the purpose in the course of restoring the image size. Deepening the network 206 or increasing branches in the network may improve the network's expression ability to handle more complex situations so as to improve accuracy, but the deeper the network 206 is, the more complex the training and prediction will be, because it increases the number of samples required by the training and the time required for the operation. In some embodiments, the initial depth of the network 206 may be set to between 10 and 20 layers, and if the segmentation results are relatively satisfactory, the depth of the network 206 may be gradually reduced. On the other hand, if the segmentation results are relatively unsatisfactory, the depth of the network 206 may be deepen till it gets a result that relatively balances accuracy and speed. In some embodiments, the selection of the branch may need to be selected according to different situations. For example, if the determination of the segmentation object is more dependent on the global features, it is advisable to add the insert operation to fuse more global information. If the segmentation object is not a specific shape (such as spherical, square, linear type), it is advisable to add long-distance short-circuit connections to fuse rough global features and detailed local features to achieve sharper segmentation results.

Figure 6:
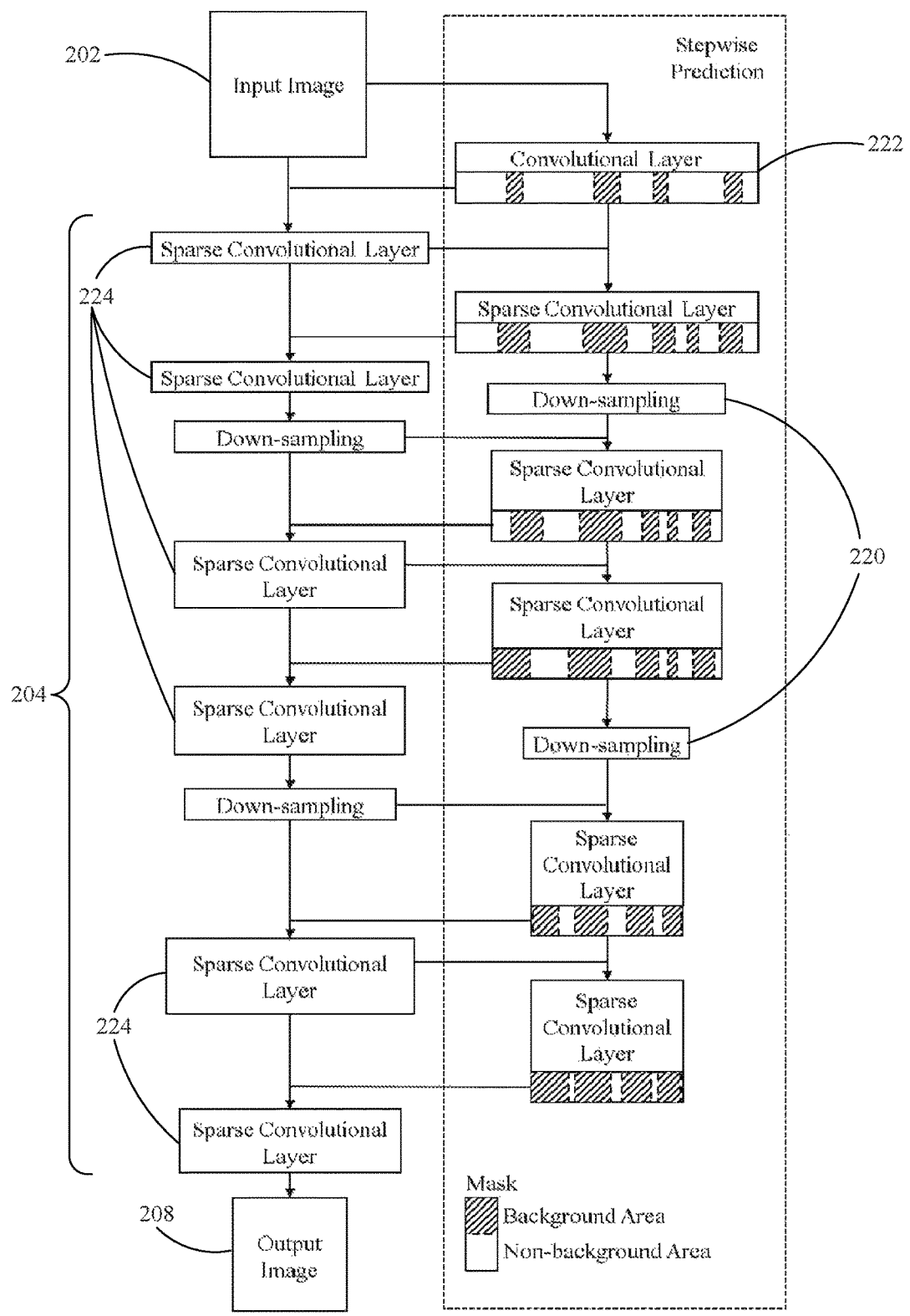
FIG. 6 shows an example of a method for accelerating a neural network that preliminarily predicts a sparsely distributed object in a two-dimensional image according to yet another embodiment.

In some embodiments, in the operation process of the neural network, the preliminary prediction may be carried out in a stepwise manner, and the operation speed is greatly increased by excluding the area that obviously does not belong to a segmentation object from each convolutional operation (as the example shown in FIG. 6). FIG. 6 illustrates an example of further accelerating a preliminary fully convolutional neural network 204 for segmenting sparsely distributed objects by stepwise prediction and sparse convolutional operation in a two-dimensional image according to an embodiment of the present disclosure. In some embodiments, before each time of the convolutional operation, a branch containing only one convolution kernel is added between the convolutional layer and the output of the previous node (e.g., a layer), to predict the probability that a corresponding pixel is of the background area. If the probabilities that a pixel and its surrounding pixels belong to the background respectively are both high, then the convolutional operation of such area will be omitted and the output of the convolutional operation for that area will be set to zero. The probability image after binarization is referred as a mask. And such convolutional layer that may selectively perform convolutional operation is referred as a sparse convolutional layer 224. The input of the sparse convolutional layer 224 includes the image to be convoluted and the mask, and the output includes image features that are generated after convolution and activation operation as the same as the convolutional layer. In some embodiments, the results of prediction of each step may be iterated into the next step of prediction. This iteration may be achieved as being the input of the next step of prediction, that is, matrix-combining is implementing for the predicted probability image obtained by the previous step and the image features. Alternatively, the iteration may also be achieved as being a mask of the next prediction, that is, the region predicted as the background will be directly considered as the background area by default in the next prediction, thus eliminating unnecessary convolution prediction calculation for the corresponding area.

In FIG. 6, some of the individual convolutional layers 222 in the preliminary fully convolutional neural network 204 are implemented as sparse convolutional layers 224, but this implementation is merely an example. In fact, any convolutional layer(s) 222 in the fully convolutional neural network that segment the sparsely distributed objects in the image may be implemented as a sparse convolutional layer 224 based on the to-be-convoluted image and the mask. In addition, the preliminary fully convolutional neural network 204 may be implemented as a single convolutional layer for predicting the probability that a corresponding pixel belongs to a background area, or may also be implemented as such convolutional layer and a sparse convolutional layer 224 connected in sequence, the sparse convolutional layer 224 is used for performing selective convolutional operation on the basis of the prediction of that convolutional layer.

The training of the whole fully convolutional neural network for segmentation of a sparsely distributed object in an image will be described below. In some embodiments, two neural networks 204 and 206 will be trained separately. And then depending on the situation (such as, whether the network structure meets the conditions, whether the segmentation results are good enough), as appropriate, combined-training may be implemented for the two neural networks 204 and 206. Note that respective step that may be involved in the training process is described as follows. Not all steps are necessary for a fully convolutional neural network, but are selected as appropriate.

Training Dataset Construction

In some embodiments, each sample in the dataset must contain both portions of input and output. The input portion is an original image that is to be segmented or a down-sampled original image to be segmented. The output portion is a probability image generated after segmentation with the same size as that of the input image. The input image may have a plurality of objects therein, and accordingly, each pixel in the output image may have a plurality of values representing the probability that the pixel belongs to the respective object, so that the sum of the plurality of values of a single pixel is 1. A pixel may belong to one or more objects, and when the pixel does not belong to an object, the probability value is 0; otherwise the probability value is greater than 0.

The output portion of the sample may be obtained manually by labeling by means of professional software in an all-manual way. It may also be obtained initially through some simple traditional algorithm, and then be manually checked and modified on this basis. In some embodiments, the same image may be labeled by several people to help reduce errors. The results may then be fused (e.g., by taking the average value).

The probability image obtained by manual labeling has the same size and same resolution as the original image. In the training process of the preliminary fully convolutional neural network, the probability image needs to be down-sampled according to the specific network structure, to obtain the output portion of the corresponding sample. For example, the system shown in FIG. 3 needs a down-sampling by $\frac{1}{16}$. For the training of the refinement fully convolutional neural network, it is necessary to extract sub-images containing different objects in the original image as the input portion of the corresponding sample for the training thereof.

Training Dataset Enhancement

In some embodiments, if the number of training samples is limited and has insufficient coverage for the actual situation, the training dataset may be subjected to enhancement operations to expand the number of training samples in order to improve the versatility and robustness of the fully convolutional neural network. These operations include, but are not limited to, the following:

Image flip: rotating the original image and the corresponding probability image, which may train the fully convolutional neural network to identify the same object taken at different angles; obtaining mirror symmetry of the original image and the corresponding probability image on the basis of different edges or faces, which may train the fully convolutional neural network to identify symmetric objects.

Contrast change: to enhance or weaken the brightness of the pixels in the original image, which may train the fully convolutional neural network to deal with the same object taken under different contrast, exposure.

Random distortion: randomly generating distortion field, to perform the same distortion operation to the original image and the corresponding probability image.

Random noise: randomly generating noise and superimposing it on the original image.

Preliminary Training

In the preliminary training, the values of the convolution kernel in the fully convolutional neural network will be randomly generated. The convolution kernel may then be automatically trained and adjusted according to the training samples through the gradient descending method. The purpose of training is to enable the fully convoluted neural network, through operations, to convert the input image into an output image that is as approximate as possible to the probability image in the training sample. According to the gradient descending method, the output of the system will be more and more approximate to the target value. When the target value cannot be approximate any more, stop training.

As the results of the training will be affected by random initialization in a certain extent, small-scale training on a smaller dataset with different random initialization in several times may be attempted in preliminary training, and then the initial result with best convergence is selected for further training on a larger dataset.

In order to prevent over-training, the training samples are divided into training dataset and validation dataset. The training dataset is generally larger than the verification dataset, and the training dataset will be used to calculate the gradient descending to approximate the optimal solution. The validation dataset is only used to calculate the distance between the prediction and segmentation result and the real target value to check the convergence of the training process. When the distances of prediction and segmentation results and the real target value are similar and cannot descend any more on the training dataset and the verification dataset, the training is regarded to have been convergent, and the training may be stopped.

Strengthened Training

When the training dataset is relatively large, in order to speed up the convergence rate, in the initial training, a smaller sub dataset may be chosen for training. Since the sub dataset cannot represent complete data distribution, some cases are not adequately considered. After the initial training, prediction and segmentation may be performed in an attempt on the complete dataset, the sub graphs with more errors in the prediction and segmentation may be extracted and added as new training data into the training dataset for a new round of strengthened training.

In practice, manual modification function may be provided to allow a user to manually modify some undesirable prediction and segmentation results. Strengthened training may use these manual modification results to re-strengthen the training network to better adapt to different datasets, different user needs. In these strengthening training courses, in order to speed up the convergence rate of training, a greater weight may be given to the manually modified part by the user to force the fully convolutional neural network to improve performance in these areas.

Transfer Training

The same fully convolutional neural network after training may adapt to different types of images as well as different types of segmentation objects. The different types of images may be images obtained in different imaging modalities including, but not limited to, X-ray images, CT images, CBCT images, spiral CT images, magnetic resonance imaging (MRI) images, ultrasound (US) images, positron emission Tomography (PET) images, single photon emission computed tomography (SPECT) images, and optical images, and the like. However, it is time-consuming for the complete training of the same fully convolutional neural network with respect to different kinds of images and segmentation objects, respectively. In practice, a trained fully convolutional neural network may be transferred quickly for segmenting different objects in different types of images through transfer learning, provided that the originally adaptable image thereof and the transferred image have the same dimension and an approximate brightness distribution. The dimension may be adjusted by re-sampling and the brightness distribution may be done by normalizing the intensity of the input image. For example, we have trained a fully convolutional neural network (see FIG. 4) for segmenting pulmonary nodules in 3D CT images, which can be used to implement segmentation of blood vessels in 3D MRI images directly through transfer learning. We only need to replace the training samples with samples of new segment task and use the convolution kernel used for the previous segment task to initialize. The training process thereafter is the same as the preliminary training. At the same time, we can also choose to freeze some convolutional layers. Such a process requires less training time than a brand new training process, while the requirement to the size of the training dataset is relatively flexible.

Stepwise Prediction Training

The training method for stepwise prediction is similar to that of the previous method, except that the prediction network will have multiple intermediate outputs. It should also be noted that, since the distribution of the segmentation objects is relatively sparse and its proportion in the prediction results is very low, it is easy to misjudge the segmentation objects to be background in the intermediate prediction results because of incomplete information. In order to prevent this situation, it is necessary to add different weights into different areas at the time of training, and the errors that occurs—the punish value (or offset value) caused by that the prediction object is incorrectly predicted to be background will be much larger than that when the background is incorrectly predicted to be the prediction object.

In some embodiments, the training process disclosed above can be performed offline to avoid occupying on-site medical resources. When the training process is completed, the fully convolutional neural network may be deployed, in the corresponding image processing system and directly be used to complete the segmentation task for new images. The segmentation task may be performed online at the medical field and may be quickly, efficiently and accurately completed, so that it may be widely used in clinical practice. The original image only needs to be input into the segmentation system in new segment tasks, and the system will automatically generate the final segmentation results through calculation, decreasing the dependency on the manual experience to be a lower limit. The system is quite friendly to users, and can ensure the accuracy of image segmentation.

Figure 7:
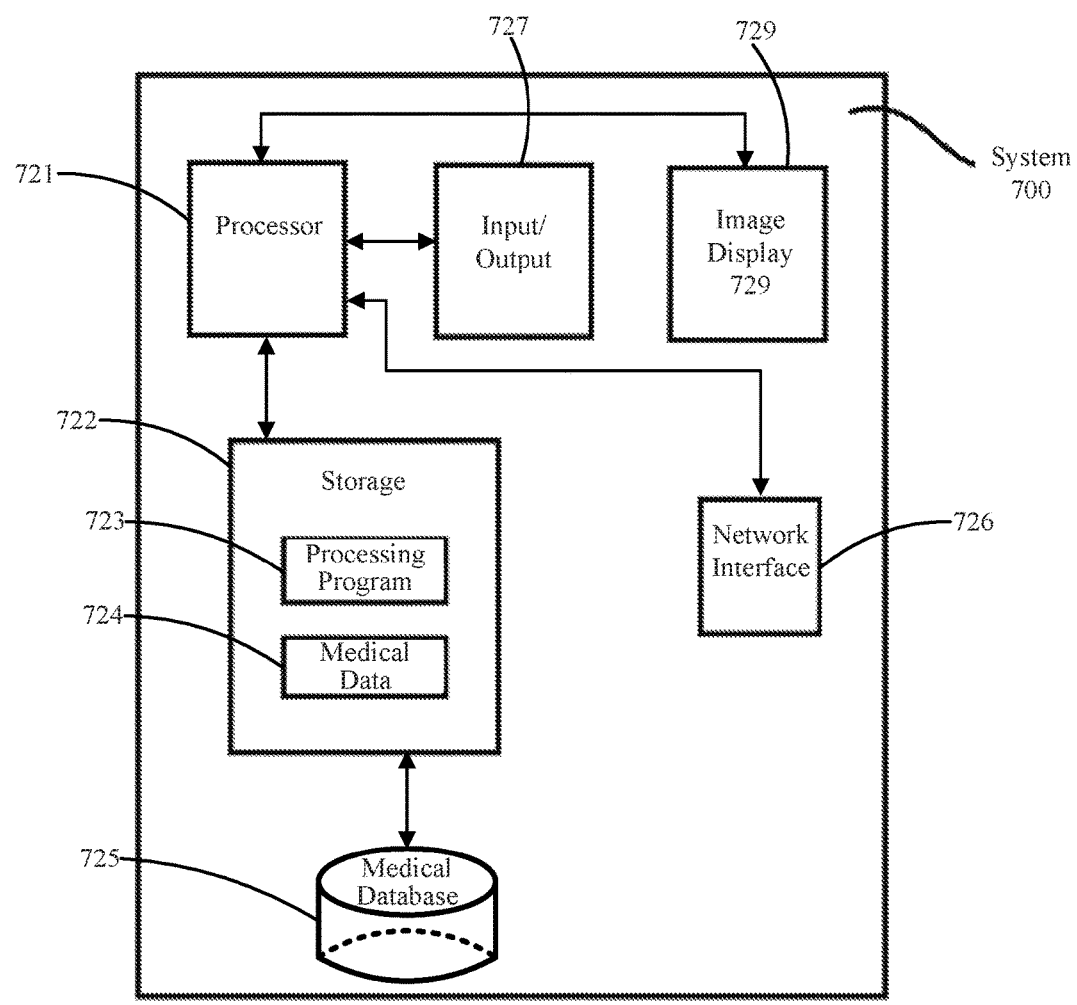
FIG. 7 illustrates a block diagram of a system for segmenting a sparsely distributed object in an image according to another embodiment.

FIG. 7 is an illustration of a system for segmenting a sparsely distributed object in an image according to yet another embodiment of the present disclosure. In some embodiments, the system 700 may be a dedicated intelligent device or a general purpose intelligent device. For example, the system 700 may be a computer customized for the hospital for processing image data acquisition and image data processing tasks, or a server placed in the cloud.

The system 700 may include one or more processor(s) 721 and one or more storage device(s) 722. It is contemplated that the processor(s) 721 and the storage device(s) 722 may be configured in a centralized or a distributed manner. It is to be understood that while FIG. 7 depicts only one processor 721 and one storage device 722, such a depiction is used merely for illustrative purposes and is not meant to be limiting. It is also contemplated that, as shown in FIG. 7, the system 700 may additionally include a medical database 725, an input/output 727, a network interface 726, and an image display 729.

The processor 721 may be a processing device that includes one or more general processing devices, such as a microprocessor, a central processing unit (CPU), a graphics processing unit (GPU), and the like. More specifically, the processor 721 may be a complex instruction set computing (CISC) microprocessor, a reduced instruction set computing (RISC) microprocessor, a very long instruction word. (VUW) microprocessor, a processor running other instruction sets, or a processor that runs a combination of instruction sets. The processor 721 may also be one or more dedicated processing devices such as application specific integrated circuits (ASICs), field programmable gate arrays (FPGAs), digital signal processors (DSPs), system-on-chip (SoCs), and the like.

The processor 721 may be communicatively coupled to the storage device 722 and configured to execute computer-executable instructions stored therein. The storage device 722 may include a read only memory (ROM), a flash memory, random access memory (RAM), a static memory, a volatile or non-volatile, magnetic, semiconductor, tape, optical, removable, nonremovable, or other type of storage device or tangible (e.g., non-transitory) computer readable medium. In some embodiments, the storage device 722 may store computer-executable instructions of one or more processing programs 723 and data generated when a computer program is executed. The processor 721 may execute the processing program 723 to implement each step of the method for segmenting a sparsely distributed object in an image hereinbefore described in conjunction with FIG. 2. Optionally, when executing the processing program 723, processor 721 may implement each step of other examples of method for segmenting a sparsely distributed object in an image hereinbefore described in conjunction with any one of FIG. 4-6. Optionally, when executing the processing program 723, processor 721 may implement each step for training the preliminary fully convolutional neural network and the refinement fully convolutional neural network described above, including preliminary training, strengthened training, as well as transfer training according to the actual situation.

The training dataset may be stored in storage device 722. In some embodiments, the dataset obtained by strengthening the training dataset may also be stored in storage device 722 together.

The processor 721 may also send/receive medical data 724 to/from the storage device 722. For example, processor 721 may receive a training dataset stored in the storage device 722 or transmit, in pairs, the segment results of the preliminary prediction and the refinement segmentation (e.g., the probability image) and the respective input images into the storage device 722, as a historical dataset. Optionally, the storage device 722 is able to communicate with the medical database 725 to obtain a training dataset therefrom or to transmit the historical dataset to the medical database 725 to be acquired and used by users, which is authorized to access the medical database 725, e.g., as a training dataset.

The medical database 725 is optional and may include multiple devices positioned in a centralized or distributed manner. The processor 721 may communicate with the medical database 725 to read the training dataset into the storage device 722 or store the historical dataset from the storage device 722 to the medical database 725. Alternatively, the medical database 725 may store an original image to be automatically segmented (hereinafter referred to as a detection image), an original image to be manually labeled in order to construct the training dataset (hereinafter referred to as a training image). The processor 721 may, communicate with the medical database 725, transmit and store the training image into the storage device 722 and display it on the image display 729 to be labeled by a physician by means of professional software using the input/output 727 and to be constructed as the training dataset by activating (one or more) processing program(s); and/or, transmit the detection image and store it in the storage device 722, optionally adjust the size of the detection image by activating (one or more) processing program(s), for the processor 721 to execute the processing program 723 so as to implement each step of the method for segmenting a sparsely distributed object in a (adjusted) detection image as described above.

The input/output 727 may be configured to allow the system 700 to receive and/or send data. The input/output 727 may include one or more digital and/or analog communication devices that allow the system 700 to communicate with a user or other machine and device. For example, the input/output 727 may include a keyboard and a mouse that allow the user to provide input.

The network interface 726 may include a network adapter, a cable connector, a serial connector, a USB connector, a parallel connector, a high speed data transmission adapter such as optical fiber, USB 3.0, lightning, a wireless network adapter such as a WiFi adapter, or a telecommunication (3G, 4G/LTE, etc.) adapter and the like. The system 700 may be connected to the network through the network interface 726. The image display 729 may be any display device suitable for displaying a medical image and its segmentation results. For example, the image display 729 may be an LCD, a CRT, or an LED display. In some embodiments, the illustration of the probability that each pixel in the image is an object may be displayed in a cloud chart or in grayscale. In some embodiments, the probability image may be further processed to obtain a segmented portion corresponding to each object and to display it in a highlighted manner on the medical image. In some embodiments, the contours of the objects obtained from the segmentation results may be registered to and then displayed on the original image, in order that the physician may implement direct comparison and thus make the diagnosis more accurately and conveniently.

Various operations or functions are described herein, which may be implemented as software code or instructions or defined as software code or instructions. Such content may be source code or differential code ("delta" or "patch" code) that can be executed directly ("object" or "executable" form). The software implementation of the embodiments described herein may be provided via an article of manufacture storing code or instructions therein or via a method in which a communication interface is operated to send data via the communication interface. The machine or computer readable storage medium may cause the machine to perform the described functions or operations and include any mechanism for storing information in the form accessible by a machine (e.g., computing device, electronic system, etc.), such as recordable/non recordable media (e.g., read-only memory (ROM), random access memory (RAM), disk storage media, optical storage media, flash memory devices, etc.). The communication interface includes any mechanism that interfaces with any of the hardwired, wireless, optical mediums and the like, to communicate with another device, such as a memory bus interface, a processor bus interface, an Internet connection, a disk controller, and the like. By providing configuration parameters and/or sending a signal, the communication interface may be configured to prepare the communication interface to provide a data signal describing the software content. The communication interface may be accessed via one or more commands or signals sent to the communication interface.

The disclosure also relates to a system for performing the operations herein. The system may be constructed specifically for the intended purpose, or the system may include a general purpose computer that is selectively activated or reconfigured by a computer program stored in the computer. Such a computer program may be stored in a computer readable storage medium such as, but not limited to, any type of disk including a floppy disk, an optical disk, a CDROM, a magneto-optical disk, a read only memory (ROM), a random access memory (RAM), an EPROM, an EEPROM, a magnetic card or an optical card, or any type of medium suitable for storing electronic instructions, wherein each medium is coupled to a computer system bus.

The above examples are only exemplary embodiments of the present disclosure and are not intended to limit the scope of the disclosure, which is defined by the claims. It is contemplated that various modifications and equivalent replacements may be made to the disclosure within the essence and protection scope thereof, and such modifications and replacements may be regarded as falling in the protection scope of the disclosure.

The invention claimed is:

1. A computer-implemented method for segmenting an image having a sparsely distributed object, comprising:
    predicting, by at least one processor, object potential areas in the image using a preliminary fully convolutional neural network;
    segmenting, by the at least one processor, a plurality of sub-images corresponding to the object potential areas in the image using a refinement fully convolutional neural network, wherein the refinement fully convolutional neural network is trained to segment images on a resolution higher than that is utilized by the preliminary fully convolutional neural network; and
    combining the segmented sub-images to generate a final segmented image.

2. The method of claim 1, wherein the preliminary fully convolutional neural network is constructed by connecting in sequence a down-sampling layer and one or more times of alternating convolutional layer and down-sampling layer connected to each other.

3. The method of claim 1, wherein the preliminary fully convolutional neural network includes:
    a single convolutional layer for determining pixels of the image that belong to a background area.

4. The method of claim 1, wherein segmenting the sub-images comprises determining a probability image for each sub-image, the probability image indicates the probabilities of pixels of the sub-image belong to the object.

5. The method of claim 1, further comprising incorporating, as an intermediate input, the prediction result by the preliminary fully convolutional neural network or image features extracted by convolutional layers of the preliminary fully convolutional neural network, into the refinement fully convolutional neural network.

6. The method of claim 5, wherein incorporating further comprises:
    transmitting information obtained at a transferring position in the preliminary fully convolutional neural network or the refinement fully convolutional neural network to a posterior position by skipping one or more calculation layers.

7. The method of claim 6, wherein the transferring position and the posterior position are respectively the output and input layers of the same type in the refinement fully convolutional neural network.

8. The method of claim 5, wherein incorporating further comprises:
    performing a parallel convolutional operation between two positions in the preliminary fully convolutional neural network or the refinement fully convolutional neural network.

9. The method of claim 5, further comprising:
    training the preliminary fully convolutional neural network and the refinement fully convolutional neural network, the training including at least one of:
        training the preliminary fully convolutional neural network and the refinement fully convolutional neural network to transfer images having same dimension and approximate luminance distribution; or
        training the preliminary fully convolutional neural network and refinement fully convolutional neural network separately when there is no intermediate input within the refinement fully convolutional neural network or when the intermediate input does not include image features extracted by the convolutional layers of the preliminary fully convolutional neural network.

10. The method of claim 1, further comprising introducing a convolutional layer for calculating a mask between at least one convolutional layer and a node anterior to the at least one convolutional layer, the at least one convolutional layer being a layer in the preliminary fully convolutional neural network or the refinement fully convolutional neural network, the at least one convolutional layer being configured to perform sparse convolutional operation based on the calculated mask.

11. A system for segmenting an image having a sparsely distributed object, the wherein the system comprising:
    a storage device storing computer-executable instructions; and a processor configured to execute the computer-executable instructions to:
  predict object potential areas in the image using a preliminary fully convolutional neural network;
  segment a plurality of sub-images corresponding to the object potential areas in the image using a refinement fully convolutional neural network, wherein the refinement fully convolutional neural network is trained to segment images on a resolution higher than that is utilized by the preliminary fully convolutional neural network; and
  combine the segmented sub-images to generate a final segmented image.

12. The system of claim 11, wherein the preliminary fully convolutional neural network is constructed by connecting in sequence a down-sampling layer and one or more times of alternating convolutional layer and down-sampling layer connected to each other.

13. The system of claim 11, wherein the preliminary fully convolutional neural network includes:
  a single convolutional layer for determining pixels of the image that belong to a background area.

14. The system of claim 11, wherein the processor is configured to execute the computer-executable instructions to segment the sub-images by determining a probability image for each sub-image, the probability image indicates the probabilities of pixels of the sub-image belong to the object.

15. The system of claim 11, wherein the processor is further configured to execute the computer-executable instructions to incorporate, as an intermediate input, the prediction result by the preliminary fully convolutional neural network or image features extracted by convolutional layers of the preliminary fully convolutional neural network, into the refinement fully convolutional neural network.

16. The system of claim 15, wherein the processor is further configured to execute the computer-executable instructions to transmit information obtained at a transferring position in the preliminary fully convolutional neural network or the refinement fully convolutional neural network to a posterior position by skipping one or more calculation layers.

17. The system of claim 16, wherein the transferring position and the posterior position are respectively the output and input layers of the same type in the refinement fully convolutional neural network.

18. The system of claim 15, wherein the processor is further configured to execute the computer-executable instructions to perform a parallel convolutional operation between two positions in the preliminary fully convolutional neural network or the refinement fully convolutional neural network.

19. The system of claim 15, wherein the processor is further configured to execute the computer-executable instructions to train the preliminary fully convolutional neural network and the refinement fully convolutional neural network by performing at least one of:
  training the preliminary fully convolutional neural network and the refinement fully convolutional neural network to transfer images having same dimension and approximate luminance distribution; or
  training the preliminary fully convolutional neural network and refinement fully convolutional neural network separately when there is no intermediate input within the refinement fully convolutional neural network or when the intermediate input does not include image features extracted by the convolutional layers of the preliminary fully convolutional neural network.

20. The system of claim 11, wherein the processor is further configured to execute the computer-executable instructions to introduce a convolutional layer for calculating a mask between at least one convolutional layer and a node anterior to the at least one convolutional layer, the at least one convolutional layer being a layer in the preliminary fully convolutional neural network or the refinement fully convolutional neural network, the at least one convolutional layer being configured to perform sparse convolutional operation based on the calculated mask.

21. A non-transitory computer-readable medium on which is stored a set of instructions for segmenting an image having a sparsely distributed object, which when executed perform operations comprising:
  predicting object potential areas in the image using a preliminary fully convolutional neural network;
  segmenting a plurality of sub-images corresponding to the object potential areas in the image using a refinement fully convolutional neural network, wherein the refinement fully convolutional neural network is trained to segment images on a resolution higher than that is utilized by the preliminary fully convolutional neural network; and
  combining the segmented sub-images to generate a final segmented image.

* * * * *